(12) United States Patent
Monk et al.

(10) Patent No.: US 10,331,143 B2
(45) Date of Patent: Jun. 25, 2019

(54) CONTROL OF MARINE SUSPENSION SYSTEMS

(71) Applicant: NAUTI-CRAFT PTY LTD, Dunsborough, Western Australia (AU)

(72) Inventors: Richard Monk, Yalyalup (AU); Michael Longman, Dunsborough (AU); Anthony Christopher Livanos, Yallingup (AU)

(73) Assignee: Nauti-Craft Pty Ltd, Dunsborough, Western Australia (AU)

( * ) Notice: Subject to any disclaimer, the term of this patent is extended or adjusted under 35 U.S.C. 154(b) by 87 days.

(21) Appl. No.: 15/315,842

(22) PCT Filed: Jun. 3, 2015

(86) PCT No.: PCT/AU2015/000333
§ 371 (c)(1),
(2) Date: Dec. 2, 2016

(87) PCT Pub. No.: WO2015/184489
PCT Pub. Date: Dec. 10, 2015

(65) Prior Publication Data
US 2017/0123436 A1    May 4, 2017

(30) Foreign Application Priority Data
Jun. 3, 2014    (AU) ................. 2014902128

(51) Int. Cl.
*G05D 1/08* (2006.01)
*B63B 1/14* (2006.01)
(Continued)

(52) U.S. Cl.
CPC ............. *G05D 1/0875* (2013.01); *B63B 1/14* (2013.01); *B63B 17/0081* (2013.01);
(Continued)

(58) Field of Classification Search
CPC ..... B63B 17/0081; B63B 39/005; B63B 1/14; B63B 39/04; B63B 2001/145; B63B 2017/0072; G05D 1/0875
(Continued)

(56) References Cited

U.S. PATENT DOCUMENTS 3,316,873 A * 5/1967 Dismukes ............... B63B 1/125
114/271
3,517,632 A    6/1970 Gray
(Continued)

FOREIGN PATENT DOCUMENTS

| GB | 2397556 | 7/2004 |
|---|---|---|
| WO | 2007072105 | 6/2007 |
| WO | 2013/181699 A1 | 12/2013 |

OTHER PUBLICATIONS

International Search Report for Application No. PCT/AU2015/000333 dated Aug. 25, 2015 (4 pages).
(Continued)

*Primary Examiner* — Nga X Nguyen
(74) *Attorney, Agent, or Firm* — Michael Best & Friedrich LLP (57) ABSTRACT

A suspension system for a marine vessel, the marine vessel including a body portion at least partially supported relative to at least a left hull and a right hull by the suspension system, the left and right hulls being moveable relative to each other and the body, the suspension system including resilient supports between the body portion and the left and right hulls. The suspension system providing at least a roll stiffness being arranged to provide a roll moment distribution (RMD) of the suspension system wherein roll forces effectively act at a position disposed within a longitudinal distance along the marine vessel from a steady state position of the resultant pressure forces acting on the left and right hulls when the marine vessel is operating in a planing or semi-planing mode. The longitudinal distance can be 20% or less of a waterline length of one of the at least a left and a right hull at design load in displacement mode.

20 Claims, 4 Drawing Sheets

(51) Int. Cl.
  *B63B 17/00* (2006.01)
  *B63B 39/00* (2006.01)
  *B63B 39/04* (2006.01)

(52) U.S. Cl.
  CPC ............ *B63B 39/005* (2013.01); *B63B 39/04* (2013.01); *B63B 2001/145* (2013.01); *B63B 2017/0072* (2013.01)

(58) Field of Classification Search
  USPC ..... 405/36, 46, 50; 114/341–344; 440/1, 13, 440/41
  See application file for complete search history.

(56) References Cited

U.S. PATENT DOCUMENTS

| | | |
|---|---|---|
| 5,228,404 A | 7/1993 | Gibbs |
| 2008/0047476 A1 | 2/2008 | Stevenson |
| 2013/0068151 A1* | 3/2013 | Heyring .................. B63B 1/14 114/61.15 |

OTHER PUBLICATIONS

Written Opinion for Application No. PCT/AU2015/000333 dated Aug. 25, 2015 (4 pages).
European Patent Office Search Report for Application No. 15802425.7 dated Feb. 28, 2018, 6 pages.

* cited by examiner

CONTROL OF MARINE SUSPENSION SYSTEMS

FIELD OF THE INVENTION

The present invention relates to suspension systems for marine vessels and specifically relates to the roll moment distribution of suspension systems for at least partially supporting the body, cabin and/or deck of a marine vessel above at least two hulls.

BACKGROUND OF THE INVENTION

It is known to provide multi-hulled marine vessels with suspension between at least two hulls and the body of the vessel as disclosed in the Applicant's International Patent Application Publication Numbers WO2004/016497, WO2011/143692, WO2011/143694 and WO2013/181699, incorporated herein by reference, which disclose various configurations of multi-hulled vessels having a body portion at least partially supported on at least four support points above at least two hulls. It has been found in vessels having one left hull and one right hull which provide the primary source of roll stability, that when the longitudinal distribution of roll forces (or the Roll Moment Distribution—RMD) is designed to suit the loads on the at least four support points when the vessel is stationary or operating in buoyancy mode, the suspension system can exhibit signs of an imbalance in the longitudinal distribution of roll forces during operation in other modes such as semi-planing or planing.

SUMMARY OF THE INVENTION

According to a first aspect of the invention there is provided a marine vessel comprising: a suspension system; a body portion; and at least a left hull and a right hull; the body portion at least partially supported relative to the left hull and the right hull by the suspension system, the left and right hull being individually moveable in heave and pitch relative to each other and the body; the suspension system including resilient supports between the body portion and the left and right hulls, the suspension system providing at least a roll stiffness; and the suspension system is-arranged to provide a roll moment distribution (RMD) wherein roll forces effectively act on each hull at a roll force position; characterised in that the roll force position is disposed within a longitudinal distance along the marine vessel from a steady state position of resultant pressure forces acting on the hull when the marine vessel is operating in a planing or semi-planing mode, the longitudinal distance being 20% of a waterline length of the hull at design load in displacement mode. Alternatively, the longitudinal distance at which the suspension system provides roll forces may preferably be within 15%, 10%, 5% or less of the position of the resultant pressure forces acting on the left and right hulls when the marine vessel is operating in a planing or semi-planing mode. Dynamic pitching motions of the hulls and wave interactions can potentially move the position of the resultant pressure forces acting on the left and right hulls outside of even the +/−20% longitudinal distance, but these events are not steady state.

The RMD of the suspension system may be fixed. Alternatively, the RMD of the suspension system may be adjustable in dependence on at least one operating parameter of the marine vessel. Optionally the roll stiffness may also be adjustable. Whether the RMD is fixed or adjustable, the suspension system resilient supports may include at least a front left, front right, back left and back right resilient support. The front left, front right, back left and back right resilient supports may include a respective front left, front right, back left and back right hydraulic actuator, the hydraulic actuators being interconnected to provide a different stiffness in two or more of a roll, pitch heave and warp suspension mode. Although these hydraulic actuators may be single acting, they are preferably double-acting. The arrangements by which the actuators are interconnected can include additional devices as are known to provide different stiffness in different suspension modes.

Where the RMD of the suspension system is adjustable in dependence on at least one operating parameter of the vessel, the at least one operating parameter of the vessel may include at least one load sensor, although if load and load position are sensed, the RMD may be adjusted to any setting between a first and a second limit. Alternatively or additionally, the at least one operating parameter of the vessel may include vessel speed and/or an operating mode (i.e. displacement or planing/semi-planing) of at least one hull. If only parameters able to indicate a hull operating mode are sensed, the adjustment of the RMD may select between a first and a second predetermined setting rather than continuously variable. Additionally or alternatively, the at least one operating parameter of the vessel may include turning condition and/or lateral acceleration and/or sea state or at least one indicator of sea state such as hull travel relative to the body or absolute, wave height or body motion.

In one or more forms of the present invention the suspension system resilient supports may include an anti-roll bar having respective left and right hull attachment points, the longitudinal position of at least the left and right hull attachment points being varied to thereby adjust the roll moment distribution (and depending on the adjustment type, the roll stiffness) of the suspension system.

In one or more forms of the present invention the suspension system resilient supports may include at least a front left, front right, back left and back right hydraulic actuator. The at least a front left, front right, back left and back right hydraulic actuator may include respective single-acting actuators including respective compression chambers, a front left fluid volume including the compression chamber of the front left single-acting actuator and a front left conduit; a back left fluid volume including the compression chamber of the back left single-acting actuator and a back left fluid conduit, the front left and back left fluid volumes being interconnected by a left fluid amplifier; a front right fluid volume including the compression chamber of the front right right single-acting actuator and a front right fluid conduit; a back right fluid volume including the compression chamber of the back right single-acting actuator and a back right fluid conduit, the front and back right fluid volumes being interconnected by a right fluid amplifier; the left fluid amplifier providing a pressure ratio between the respective left fluid volumes, and the right fluid amplifier providing a pressure ratio between the respective right fluid volumes, the left and right fluid amplifiers modifying the roll moment distribution provided by the hydraulic actuators. That is so say, the hydraulic actuators and their mounting mechanical advantages provide a fixed, RMD, but the use of fluid amplifiers can allow the ratio of the front to rear pressures to be changed to make either a new fixed or a moving RMD depending on the form of fluid amplifier. Alternatively, the at least a front left, front right, back left and back right hydraulic actuator may include respective double-acting actuators, the front left and front right double-acting actuators being laterally cross-connected (a compression chamber of one actuator to a rebound chamber of the laterally opposite actuator) to form a front left and front right fluid volume, the back left and back right double-acting actuators being laterally interconnected to form a back left and back right fluid volume. The system may include a fluid amplifier, the front left and back left fluid volumes being interconnected by left fluid conduits including the fluid amplifier and the front right and back right fluid volumes being interconnected by right fluid conduits including the fluid amplifier. In either case, the left and right fluid conduits may optionally further include a respective bypass valve to selectively provide a bypass around the fluid amplifier to enable switching of the roll moment distribution, and the bypass arrangement is switchable, preferably in response to at least one operating parameter of the marine vessel. Alternatively, where the actuators are double-acting the fluid amplifier may be adapted to vary the proportion of pressure between the front left and back left fluid volumes and between the front right and back right fluid volumes, by using a variable pivot point for example, to enable the RMD to be continuously varied, rather than switched between two settings.

In one or more forms of the present invention the suspension system resilient supports may include individual front left, front right, back left and back right supports, where at least the front (i.e. the front left and front right) or at least the back (i.e. the back left and back right) supports may include respective actuators which may be hydro-pneumatic, oleo-pneumatic, pneumatic, hydraulic or electro mechanical devices. In this case, said front left and front right and/or said back left and back right actuators may be controlled to thereby adjust the RMD of the suspension system. For example the front left and front right supports can include coil springs and the back left and back right supports can include hydro-pneumatic actuators, the stiffness of the hydro-pneumatic actuators being adjusted to thereby adjust the RMD. Alternatively, the front and back supports can include hydraulic devices such as adjustable spring seats, the front left, front right, back left and back right hydraulic devices being controlled to adjust the load on the respective supports and thereby vary the RMD.

In one or more forms of the present invention the suspension system may include individually controllable front left, front right, back left and back right actuators which may be hydraulic or electromagnetic or other electro-mechanical devices. Said individually controllable actuators may be in series with the resilient supports (being for example adjustable spring seats) or alternatively said individually controllable actuators may be in parallel with the resilient supports such as variable push-out force damping devices or electromagnetic motor-generator linear devices, or may be provided completely separate to the resilient supports. In any case, said individually controllable actuators may be controlled to thereby adjust the roll moment distribution of the suspension system.

In one or more forms of the present invention the body portion may be entirely supported above the at least a left hull and a right hull. Then the at least a left hull and a right hull may be one left hull, one right hull, one forward hull and one rearward hull.

Alternatively, the body portion may include a hull portion, so the body portion is only partially supported above the at least a left hull and a right hull. Whether the body is entirely or just partially supported above the at least a left hull and a right hull, the least a left hull and a right hull may be one left hull and one right hull, i.e. the vessel is then either a catamaran or a trimaran.

In one or more forms of the present invention the at least a left hull and a right hull may include one left hull, one right hull and one forward hull and optionally one rearward hull.

Another aspect of the present invention provides a method of controlling the roll moment distribution of a suspension system for a marine vessel, the marine vessel including a body portion at least partially supported relative to at least a left hull and a right hull by the suspension system, the suspension system being arranged to enable adjustment (such as switching or varying) of the roll moment distribution of the suspension system, the method including the steps of detecting at least one operating parameter of the marine vessel and adjusting the roll moment distribution of the suspension system in dependence on said at least one operating parameter.

It will be convenient to further describe the invention by reference to the accompanying drawings which illustrate preferred aspects of the invention. Other embodiments of the invention are possible and consequently particularity of the accompanying drawings is not to be understood as superseding the generality of the preceding description of the invention.

DESCRIPTION OF THE PREFERRED EMBODIMENT

Figure 1:
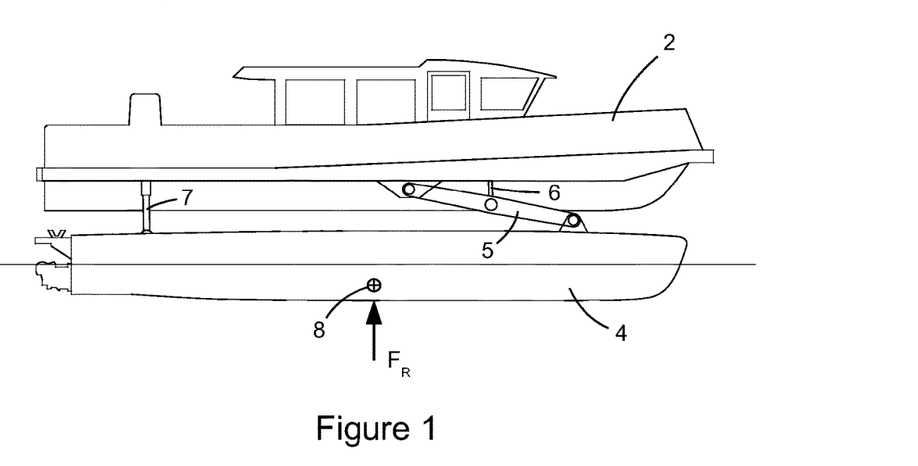
FIG. 1 is a side view of a marine vessel according to an embodiment of the present invention.

Referring initially to FIG. 1, a marine vessel 1 (in this case a catamaran) is shown having a body portion 2 suspended above hulls 4 that are moveable relative to the body 2. The suspension geometry is a front leading arm 5, front support 6 and rear combination of sliding arm and support 7 in an arrangement as disclosed in the Applicant's International Patent Application Number WO2013/181699. When stationary or operating in displacement mode, the resultant force $F_R$ of the water pressure acting on the surfaces of the hull 4 below the waterline acts substantially through the centre of buoyancy of the hull indicated at 8. The centre of buoyancy changes with load and load position as it is the centroid of the displaced volume.

Throughout the Figures, similar parts, items or features are given like reference numerals.

Figure 2:
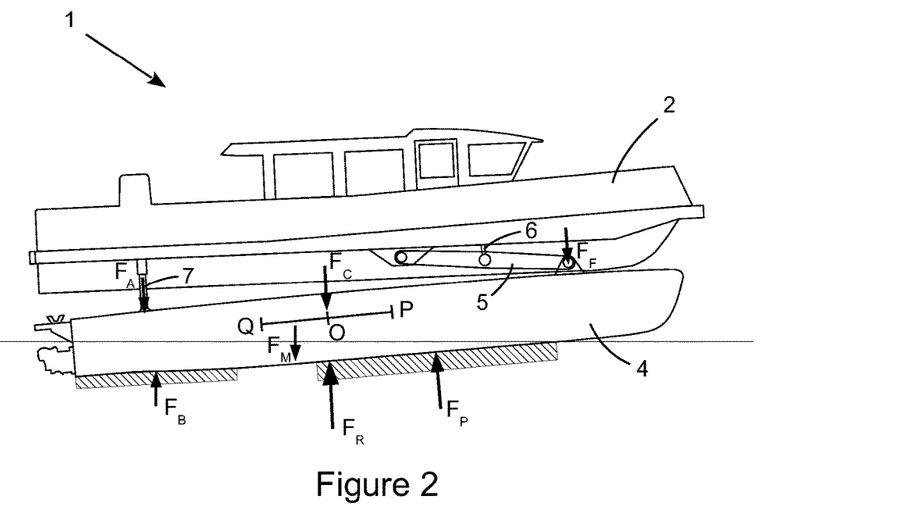
FIG. 2 is a side view of the vessel of FIG. 1 operating in a different mode.

When the vessel 1 is travelling sufficiently fast to be operating in planing or semi-planing mode as shown in FIG. 2, the buoyancy force $F_B$ is typically assumed to provide between 10% and 50% of the support forces on the hull and act around the rearmost third of the hull length below waterline, with the remaining 90% to 50% of the support forces on the hull being provided by a pressure force $F_P$ resulting from the hydro-dynamic pressure acting over an area of the hull at around three-quarters of the length below waterline (all lengths being conventionally measured from the transom). So while the centre of pressure where the resultant pressure force $F_P$ acts while planing can in some cases be assumed to be the centre of forces acting on the hull while planing, the component of buoyancy forces $F_B$ can also be allowed for or otherwise included for additional accuracy. In FIG. 2, the resultant force $F_R$ is shown as comprising both the pressure force $F_P$ due to planing and the buoyancy force $F_B$. The hull is shown with a 5 degree nose up attitude and the body position relative to the hull has been adjusted down by around 3 degrees, leaving it 2 degrees nose up. The body is not completely levelled during planing or semi-planing operation to leave more compression travel available in the front supports 6 to absorb slamming impacts on the hulls without transmitting corresponding accelerations to the body.

In FIG. 2 the force $F_M$ due to gravity acting on the mass of the hull structure, motor, gearbox, propulsion unit and/or fuel and other parts fixed to the hull, is shown. Also shown are the fore suspension force $F_F$ acting on the hull at the front mount point and the aft suspension force $F_A$ acting on the hull at the back mount point. As there is only one fore (front) suspension mounting location on each hull and one aft (back or rearwards) suspension mounting location on each hull, these fore and aft suspension support forces $F_F$ and $F_A$ include heave, pitch and roll (and possibly warp) components depending on the conditions. For example if the centre of mass of the body is in the centre of the vessel and the vessel is travelling in a straight line without any leeway or other lateral forces, then there would be no roll forces required, so the roll components of the suspension forces would be zero. However if the vessel is turning for example, a roll couple can be required to react the centrifugal force generated by the lateral acceleration of the body. The roll couple acts in an upwards direction on one hull and in an equal and opposite (downwards) direction on the opposite hull. The roll couple force $F_C$ acting on the hull shown in FIG. 2 is a component of the fore and aft suspension support forces $F_F$ and $F_A$ acting between the body and that hull. The effective longitudinal position at which the roll couple forces act on the left and right hulls is determined by the roll moment distribution of the suspension system.

While the hulls are in a planing or semi-planing mode as shown in FIG. 2, the length of hull below the waterline is reduced, so the torque reacting any yaw of the vessel is similarly reduced. Also in the example shown in FIG. 2, the longitudinal position of the resultant force $F_R$ between the hulls and the water (measured from the transom) is also reduced, i.e. it has moved rearwards. So to maintain directional stability when the hulls are operating in a planing or semi-planing mode, the longitudinal position about which roll reacting forces are applied (i.e. the roll couple forces $F_C$) must similarly be rearwards of the displacement mode centre of buoyancy.

While the hulls are in displacement mode as shown in FIG. 1, the length of hull below the waterline is increased, so the torque reacting any yaw of the vessel is increased as is the pitch damping of the hull relative to the water. For this reason, it is not as important to ensure that the longitudinal position about which roll reacting forces are effectively applied is at or close to the longitudinal position of the resultant force $F_R$ acting between the hulls and the water (through the centre of buoyancy). So if the roll moment distribution of the suspension system is fixed, i.e. if the longitudinal position about which roll reacting forces are effectively applied is not adjustable, then preferably the roll moment distribution of the suspension system is set for the planing or semi-planing mode of operation. While ideally the longitudinal position "O" about which roll reacting forces are effectively applied is the same as or coincident with the longitudinal position of the resultant force $F_R$ acting between the hulls and the water, the position of $F_R$ can vary both with different steady state conditions and dynamically, so preferably the longitudinal position "O" about which roll reacting forces $F_C$ are effectively applied is within 20% of the longitudinal position of the respective resultant force $F_R$ acting between the respective hull and the water. Depending on the vessel and the conditions, this variation can be reduced, so then the longitudinal position about which roll reacting forces are effectively applied can be within 15%, 10%, 5% or even less of the longitudinal position of the resultant force $F_R$ acting between the hulls and the water.

The longitudinal position of the resultant force $F_R$ acting between the hulls and the water while planing varies with different steady state conditions such as load magnitude, load position and vessel speed relative to the water. For example if a large load is placed towards the front of the vessel, the steady state planing angle of the hulls would be more horizontal, moving the planing pressure force and therefore the resultant force $F_R$ forwards from "O" to "P". Similarly, if a large load is placed towards the back of the vessel, the steady state planing angle of the hulls would be inclined, nose up, further away from horizontal, moving the planing pressure force and therefore the resultant force $F_R$ rearwards instead, from "O" to "Q". If the distance from "O" to "P" is 20% of the waterline length of the hull at design load in displacement mode, and if the distance from "O" to "Q" is similarly 20% of the displacement mode waterline length, then the longitudinal position about which the roll reacting forces are applied (i.e. the longitudinal position of the roll couple force $F_C$ on the hull in FIG. 2) is within 20% of the longitudinal position of the resultant force $F_R$ acting on the hull due to water forces from buoyancy and planing pressure. While a range of longitudinal position change of $F_R$ of +/−20% should include most practical hull and vessel designs, many vessels will have a combination of hull form, design load limits and/or trim angle adjustment devices (such as interceptor tabs or changing propulsion thrust angle) that ensures a lesser change in the longitudinal position of the resultant force $F_R$ to ensure more consistent planing performance with changes in load position and/or speed. Therefore even if the longitudinal position at which the roll reacting forces are effectively applied is fixed, it can for many vessels remain within less than +/−20%, such as 15%, 10%, 5% or even less of the longitudinal position of the resultant force $F_R$ acting between the hulls and the water in steady state planing operation in flat, calm water.

In general, minimising the range of longitudinal distance OP and OQ between the effective roll reacting forces $F_C$ and the resultant force $F_R$ minimises the magnitude of pitch moment change due to angled (i.e. non head-on) wave encounters. As the roll reacting forces are generally equal and opposite from one hull to the other, i.e. the roll couple forces $F_C$, such pitch moment changes are in opposite directions on opposite hulls, so encountering angled waves that generate a roll moment on the body can generate a warp force or motion of the hulls. So minimising the range of longitudinal distance OP and OQ between the effective roll reacting forces FC and the resultant force FR can minimise any undesired warp motion of the hulls, improving fine directional stability.

The longitudinal position of the resultant force $F_R$ acting between the hulls and the water while planing also varies dynamically due to wave interaction and due to pitch of the hulls relative to the water. In this case, the longitudinal position of the planing pressure force $F_P$ can move rapidly forwards and rearwards a large amount giving a change in the longitudinal position of the resultant force FR acting between the hulls and the water of greater than 20%. It can therefore be beneficial to dynamically adjust the roll moment distribution of the suspension system, i.e. actively adjust the longitudinal position at which the roll reacting forces are effectively applied. However this depends on the type of suspension system, not just that it can vary roll moment distribution, but that it can do so with the required frequency and efficiency. For example even if the suspension system can vary roll moment distribution throughout a range (as opposed to switch between two states) it may be more efficient to only compensate for load and/or speed and use damping to control hull pitch relative to the body during wave interactions.

If the roll moment distribution is (permanently) fixed and therefore biased towards the planing or semi-planing mode of operation as discussed above, then when the vessel is stationary or operating in displacement mode, uneven front to rear hull motions due to wave inputs may cause the body portion of the vessel to be rolled to an angle that is greater than the roll angle of the average plane through the four support points (front left, front right, back left and back right) between the body and the hulls. If the planing or semi-planing roll moment distribution does produce an unwanted effect on the stationary (or displacement mode) performance of the suspension system, it can be preferable to provide an adjustable roll moment distribution for comfort, to reduce roll accelerations on the body, as well as for the previously discussed warp stability. The roll moment distribution can for example be switched between a displacement setting and a planing setting, or alternatively the roll moment distribution can be continuously varied to keep the longitudinal position about which roll reacting forces are effectively applied within 20% (or preferably much less as discussed above) of a time averaged longitudinal position of the resultant force $F_R$ acting between the hulls and the water (time averaged to remove the effects of wave encounters and other such dynamic interactions while correcting for shifts in load, changes in speed, sea state, heading and/or turning condition for example).

The rear portion of catamaran hulls (or the back hulls of a vessel having a front and a back hull on each side) typically have less motion than the front portion of the hulls and the planing area generally gets narrower towards the front of a hull, so the longitudinal position of the resultant water force $F_R$ (comprising buoyancy and planing forces) can move less forwards than rearwards (i.e. the distance OP is less than the distance OQ). Therefore if the roll moment distribution of the suspension system is not actively varied with wave inputs (i.e. fixed or varied only periodically or based on time averaged inputs), it can be advantageous to set the longitudinal position about which roll reacting forces are effectively applied to be close to, but slightly away from the steady state longitudinal position of the resultant force $F_R$ acting between the hulls and the water, for example rearwards by preferably up to 5%, but can be more, such as 10% or 15%.

Figure 3:
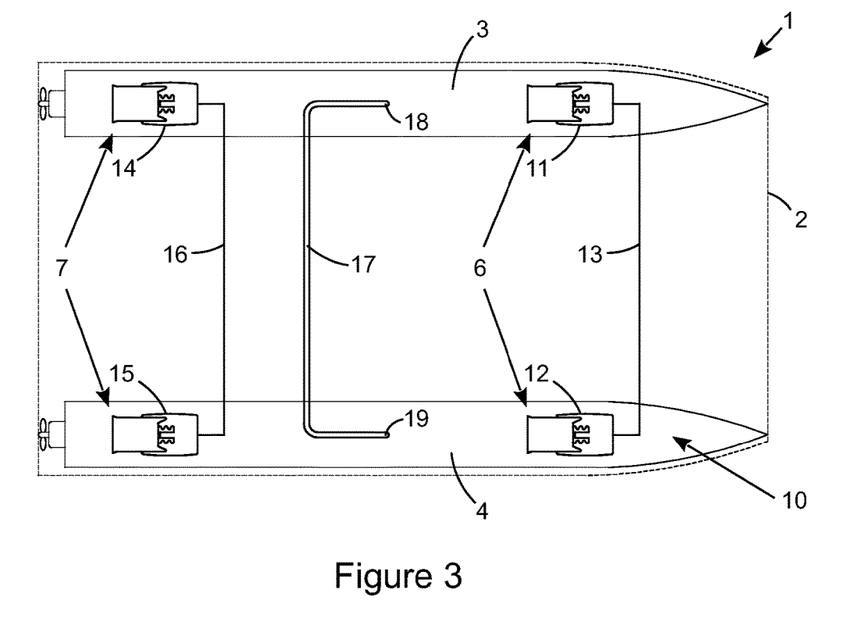
FIG. 3 is a schematic plan view of a marine vessel according to an embodiment of the present invention.

FIG. 3 shows a basic form of low warp stiffness suspension system 10 applied to the vessel from FIGS. 1 and 2 in schematic form. As it is a plan view, the left hull 3 is also now visible. The front supports 6 are front left and front right air springs 11, 12, interconnected by a front conduit 13, so provide resilient support with zero roll stiffness. Similarly at the rear, the supports 7 are back left and back right air springs 14, 15, interconnected by a back conduit 16, again providing resilient support with zero roll stiffness. An anti-roll bar 17 is shown to provide roll stiffness, the lateral centre portion of the bar being rotatably connected to the body portion 2 and the left and right ends 18, 19 of the bar being connected to the respective hulls 3 and 4. If the anti-roll bar is in a horizontal plane when the vessel is stationary, and if any drop links between the ends 18, 19 of the bar and the hulls 3, 4 are vertical, then the roll forces exerted by the anti-roll bar will be vertical and have lines of action passing through the ends of the anti-roll bar. In that case, when the ends of the anti-roll bar are above the resultant force (i.e. $F_R$ for the displacement or planing cases in FIG. 1 or 2) then the roll forces on the hulls will act through the effective support point of the hulls relative to the water, so for a pure roll motion there will be zero warp induced. The further away from the effective support point of the hulls relative to the water (i.e. a point defined by $F_R$) that the roll forces effectively act, the greater the warp induced during roll, so while some misalignment may be quite acceptable, the magnitude depends on the type of hull form and many other vessel and condition specific parameters. The initial position of the anti-roll bar and the angle of the drop links can be varied from the above simplified horizontal and vertical orientation example to ensure that the roll forces act along the required line of action on each hull. While the geometry of the anti-roll bar may be adjusted or the position of the anti-roll bar adjusted to vary the roll moment distribution (and indeed the roll stiffness) at any time, it is generally impractical to do so. Therefore the anti-roll bar preferably provides a fixed roll moment distribution that is preferably chosen to suit the resultant force of the water on the hulls during semi-planing or planing operation (i.e. $F_R$ in FIG. 2).

Figure 4:
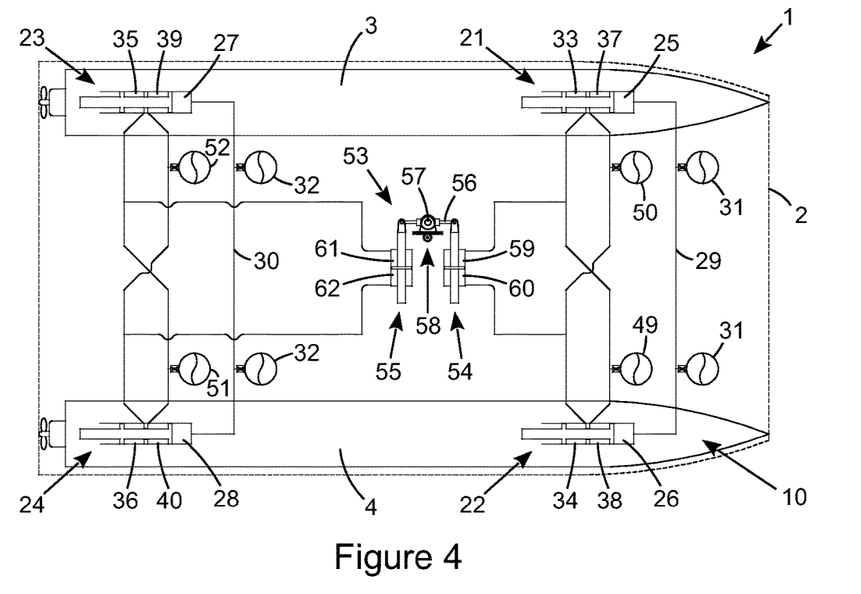
FIG. 4 is a schematic plan view of a marine vessel according to an embodiment of the present invention.

FIG. 4 shows a low warp stiffness hydraulic suspension system 10 in which the roll moment distribution can be continuously varied, on the same catamaran style of marine vessel 1 shown in FIGS. 1 and 2. Four triple-acting hydraulic actuators or rams 21, 22, 23, 24 are provided, each having a main support compression chamber 25, 26, 27, 28, a roll compression chamber 33, 34, 35, 36 and a roll rebound chamber 37, 38, 39, 40. In this example the roll chambers (compression and rebound) are of equal cross-sectional area so provide negligible or substantially zero push-out (support) force. The support compression chambers 25, 26 of the front left ram 21 and the front right ram 22 are in fluid communication by a front support fluid conduit 29, forming a front support fluid volume including front support fluid pressure accumulators 31. Similarly the support compression chambers 27, 28 of the back left ram 23 and the back right ram 24 are in fluid communication by a back support fluid conduit 30, forming a back support fluid volume including back support fluid pressure accumulators 32. As with the interconnected air springs in FIG. 3, the support fluid volumes provide resilient support of the body portion 2 above the hulls 3, 4 with substantially zero roll stiffness.

The roll compression and rebound chambers are laterally cross connected to provide volume change and therefore stiffness in roll but not in heave. For example: the front left roll compression chamber 33 is connected to the front right roll rebound chamber 38 forming a front left roll compression volume; the front right roll compression chamber 34 is connected to the front left roll rebound chamber 37 forming a front right roll compression volume; the back left roll compression chamber 35 is connected to the back right roll rebound chamber 40 forming a back left roll compression volume; the back right roll compression chamber 36 is connected to the back left roll rebound chamber 39 forming a front right roll compression volume. Each roll compression volume is connected to a roll moment distribution device 53 which comprises two double acting rams 54, 55 balanced by a pivoted beam 56, the pivot 57 of which is moveable, for example by a rack and pinion arrangement 58 to enable the ratio between the front and rear rams to be continuously varied. The front left roll compression volume also includes a front left roll fluid pressure accumulator 49, and the chamber 59 in ram 54 of the roll moment distribution device 53; the front right roll compression volume also includes a front right roll fluid pressure accumulator 50, and the chamber 60 in ram 54 of the roll moment distribution device 53; the back left roll compression volume also includes a back left roll fluid pressure accumulator 51, and the chamber 61 in ram 55 of the roll moment distribution device 53; the back right roll compression volume also includes a back right roll fluid pressure accumulator 52, and the chamber 62 in ram 55 of the roll moment distribution device 53.

A roll moment distribution device able to provide continuously variable adjustment of the roll moment distribution of the suspension system is effectively changing the balance of front roll forces to back roll forces as if the balance is determined by a balance beam with front roll forces one end, back roll forces the opposite end and the pivot of the balance beam being movable between the ends of the balance beam. The roll force component of the front supports provides the front roll forces and the roll force component of the back supports provides the back roll forces. So to complete the analogy, the front support point on the hull can be said to be one end of the balance beam, the back support point on the hull is the opposite end of the balance beam and the longitudinal position at which the roll couple effectively acts on the hull is the pivot position of the balance beam. The roll moment distribution device 53 in FIG. 4 has front roll pressures in the chambers 59 and 60 of ram 54 which directly relate to the front roll forces in the support rams 21 and 22, so the ram 54 generates a force on one end of the pivoted (balance) beam 56 that relates to the front roll moment. If the front left roll compression volume increases in pressure and the front right roll compression volume decreases in pressure to react a roll moment from a turn to the right, the pressure difference across the piston in ram 54 generates a force pulling the piston rod assembly of the ram 54 in a direction away from the pivoted beam 56. Similarly the back roll pressures in the chambers 61, 62 of ram 55 directly relate to the back roll forces in the support rams 23, 24, so the ram 55 generates a force on the opposite end of the pivoted (balance) beam 56 that relates to the back roll moment and in a turn to the right, the relative increase in pressure in chamber 61 of ram 55 pulls the piston rod assembly of ram 55 in a direction away from the pivoted beam 56. Using the rack and pinion arrangement 58 to slide the pivot 57 along the pivoted beam 56, for example in response to at least one operating parameter of the vessel, allows this balance between front and back roll forces to be continuously varied, thereby adjusting the ratio (or balance) between the front and back roll forces. The roll components in FIG. 4 are one example of an arrangement to provide variable adjustment of the roll moment distribution of the suspension system 10. Ideally the roll moment distribution is only adjusted at a low frequency (less than once every 2 seconds for example, preferably less than once every 5 seconds or even longer, into minutes) to compensate for changes in the steady state operation of the vessel effects such as the effects of load change and speed change. While the load can change in use, it will not typically change at the same frequency as wave interactions. For example on a sight-seeing vessel most of the passengers may move to one area of the vessel for a period to get a better view, but they will not move back and forth at wave frequencies. It is possible to adjust the roll moment distribution at higher frequencies (more often than once every 2 to 5 seconds) to compensate for wave interactions or other dynamic events, but it is preferable to adjust the roll moment distribution in response to steady state operation variables. If there is a change in speed for example, the roll moment distribution may be adjusted within a few seconds, but then not adjusted again while the speed is maintained, if the load on the vessel and other parameters affecting the steady state operation of the vessel remain the same also.

Figure 5:
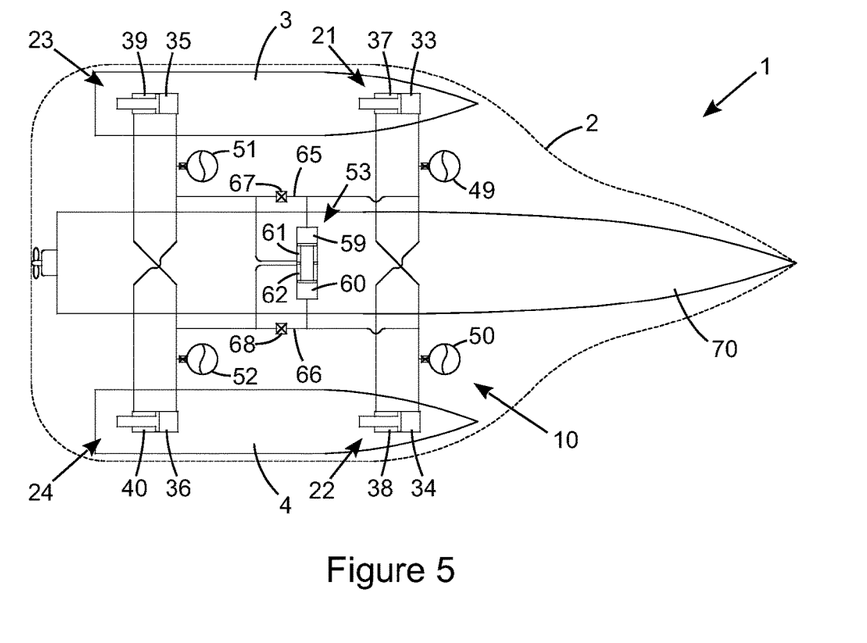
FIG. 5 is a schematic plan view of a marine vessel according to an embodiment of the present invention.

FIG. 5 shows a similar roll reacting hydraulic circuit to the roll reacting circuit components in FIG. 4, but in FIG. 5 the circuit has two main differences: the first being that the roll compression chambers have a larger cross-section than the roll rebound chambers so the pressures in the roll volumes will provide a push out force, which can be desirable if as in FIG. 5 there is no separate support compression volumes providing push-out (support) force; the second being that the four chambers 59, 60, 61, 62 in the roll moment distribution device are formed in a single four-chambered ram so the roll moment distribution provided by the roll circuits (comprising the roll volumes) is fixed by the initial sizing and installed mechanical advantage of the rams 21, 22, 23, 24 and the effective areas of the chambers 59, 60, 61, 62 in the roll moment distribution device 53. The provision of bypass arrangements comprising bypass conduits 65, 66 incorporating bypass valves 67, 68 allow the pressure proportioning effects of the roll moment distribution device 53 to be bypassed, for example in response to at least one operating parameter of the vessel. Bypass conduit 65 allows the front left and back left roll volumes to be selectively connected together, as determined by the operation of the bypass valve 67; and similarly bypass conduit 66 allows the front right and back right roll volumes to be selectively connected together, as determined by the operation of the bypass valve 68. Therefore, when the bypass valves 67 and 68 are open, the roll moment distribution provided by the roll circuits (comprising the roll volumes) is fixed by the initial sizing and installed mechanical advantage of the rams 21, 22, 23, 24, with the influence of the roll moment distribution device being negated.

To clarify, the roll moment distribution device 53 comprises two aligned cylindrical bores in each of which is a piston. The two pistons are joined together by a rod that passes through the wall between the two cylindrical bores and (in this example) the back left roll chamber 61 and the back right roll chamber 62. When the bypass arrangements (or the valve in each bypass arrangement) are open, the left roll compression volumes are in fluid communication, so the pressure in the front left roll compression volume is substantially the same as the pressure in the back left roll compression fluid volume; and similarly the right roll compression volumes are in fluid communication, so the pressure in the front right roll compression volume is substantially the same as the pressure in the back right roll compression fluid volume. Therefore the distribution between the front and rear ram roll forces is determined by the pressure areas of those rams. Conversely, when the bypass arrangements (or the bypass valve in each bypass arrangement) are closed, the ratio of the pressure in the front roll volumes to the pressure in the back roll volumes is determined by the bore and rod diameters of the roll moment distribution device 53, i.e. the ratio of the annular piston face area of chambers 61 and 62 to the whole piston face area of chambers 59 and 60. Because the roll moment distribution device is able to set a ratio between pressures in the front versus back volumes and a ratio of change in fluid volume between the front and back volumes, it can also be referred to as a fluid amplifier.

So the combination of roll moment distribution device and its bypass arrangements illustrated in FIG. 5 provides a switchable roll moment distribution. The two options of roll moment distribution (with the roll moment distribution device either operational or bypassed) can be designed to suit two operating modes of the vessel such as a displacement mode and a planing mode, and for example the modes switched in response to at least one operating parameter of the vessel. Preferably the switching of the roll moment distribution is between a planing mode and a displacement mode in which case the at least one operating parameter can be vessel speed. However the switching of the roll moment distribution can be between any two steady state conditions (which can both be planing or semi-planing modes) where the resultant force $F_R$ is in a substantially different longitudinal position. For example, in a vessel designed to carry a load at a forward position, that load being added or removed such as pick up or delivery of a container: when the load is present, the overall vessel mass position is more forward, the vessel trim more level and $F_R$ more forward than when the load is not present and the overall vessel mass position is more rearward, the vessel trim more bow up and FR more rearward; then the roll moment distribution can be changed in dependence on the presence of the load, which can be detected by suspension pressures or an operator switching a manual input between laden and unladen operation.

A long central hull 70 is also shown in FIG. 5 as the invention is applicable to any multi-hulled vessel having a moveable left hull 3 and a moveable right hull 4. No supports are shown in relation to the central hull 70 as is can optionally be fixed to the body portion 2. Alternatively the body can suspended above the central hull.

Figure 6:
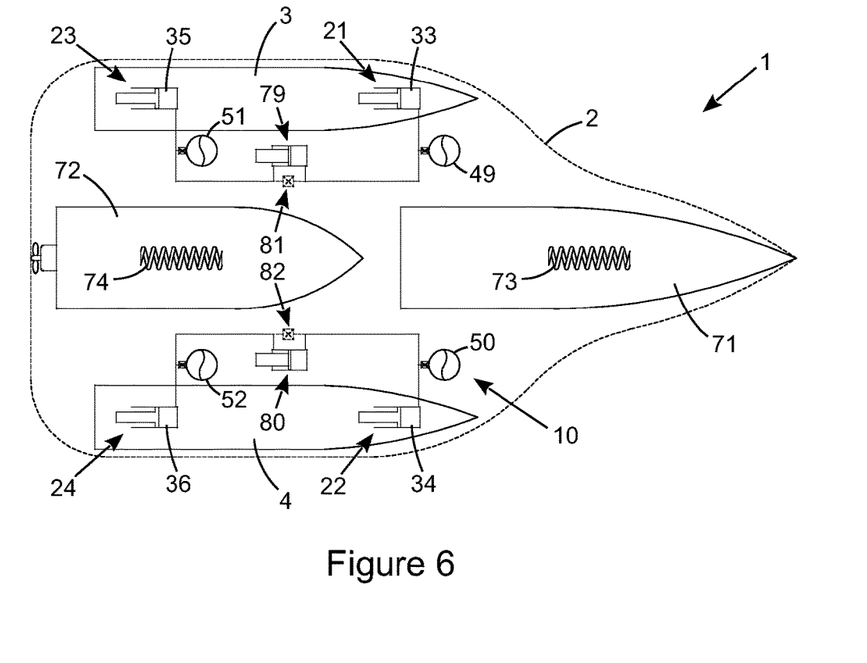
FIG. 6 is a schematic plan view of a marine vessel according to an embodiment of the present invention.

FIG. 6 shows a further hull configuration to which the present invention is applicable. In addition to the left hull 3 and the right hull 4 is a front hull 71 and a back hull 72. The vessel is resiliently supported above all four hulls in this example although the back hull may alternatively be rigidly fixed to the body. A coil spring 73 or 74 is shown between each of the front or back hull and the body to indicate any known form of resilient supports. The roll rams 21, 22, 23, 24 are shown as single-acting so provide similar heave and roll stiffness in operation and are connected longitudinally (i.e. front to back). However between the front left roll compression chamber 33 (which together with the fluid pressure accumulator 49 form part of a front left fluid volume) and the back left roll compression chamber 35 (which together with the fluid pressure accumulator 51 form part of a back left fluid volume) is provided a left roll moment distribution device 79, being a double-acting ram with unequal piston areas to provide a fixed proportion between the pressures in the front and back left fluid volumes. A similar right roll moment distribution device 80 is provided between the front right roll compression chamber 34 (which together with the fluid pressure accumulator 50 form part of a front right fluid volume) and the back right roll compression chamber 36 (which together with the fluid pressure accumulator 52 form part of a back right fluid volume). These roll moment distribution devices which provide a higher pressure in the back volumes than the front volumes, or a larger fluid volume change in the front volumes than the back volumes, can alternatively be referred to as fluid amplifiers. The left and right roll moment distribution devices can optionally be bypassed by a respective switchable bypass arrangement 81, 82, including a valve in a conduit (shown in dashed lines in FIG. 6 and similar to valve 67 in conduit 65 and valve 68 in conduit 66 in FIG. 5) between the respective left or right front and back fluid volumes. When the bypass arrangements are closed, the roll moment distribution devices transfer pressures and flows in a ratio between the front and back rams, then as in FIG. 5, the roll moment distribution of the forces in the roll rams 21, 22, 23, 24 is determined by the initial sizing and installed mechanical advantage of the rams 21, 22, 23, 24 and the effective areas of the chambers in the roll moment distribution devices 79 and 80. This can be used to set the roll moment distribution while using a common support ram rod, bore and/or stroke. However, when provided, the optional switchable bypass arrangement 81, 82 can allow the roll moment distribution to be switched in a manner similar to that described for FIG. 5.

In FIGS. 5 and 6, if no bypass valves are provided, the roll rams 21, 22, 23, 24 should ideally be sized and positioned such that the required (and now fixed) roll moment distribution is provided by the roll rams and interconnecting conduits without the need for any roll moment distribution devices. The interconnecting conduits would in both cases include the bypass conduits in a permanently open state.

A further alternative arrangement to FIG. 5 and one that maintains the ability to switch roll moment distribution is to omit the roll moment distribution device 53, but maintain the switchable bypass conduits. When the conduits are open, the roll moment reacting system of roll volumes reacts roll without providing a warp stiffness and as the pressures in the left roll volumes are equalised and the pressures in the right roll volumes are equalised, the roll moment distribution is set by the ram sizes and mechanical advantages. However when the bypass conduits are closed the static pressure, and the rate of change pressure with roll can be different from the front to the rear roll volumes. Using accumulators 49, 50, 51, 52 of specifically chosen gas volumes can provide a difference in roll moment distribution in this separate front vs rear mode with bypass conduits closed, although the roll moment reacting system of roll volumes must provide a warp stiffness in this case.

Figure 7:
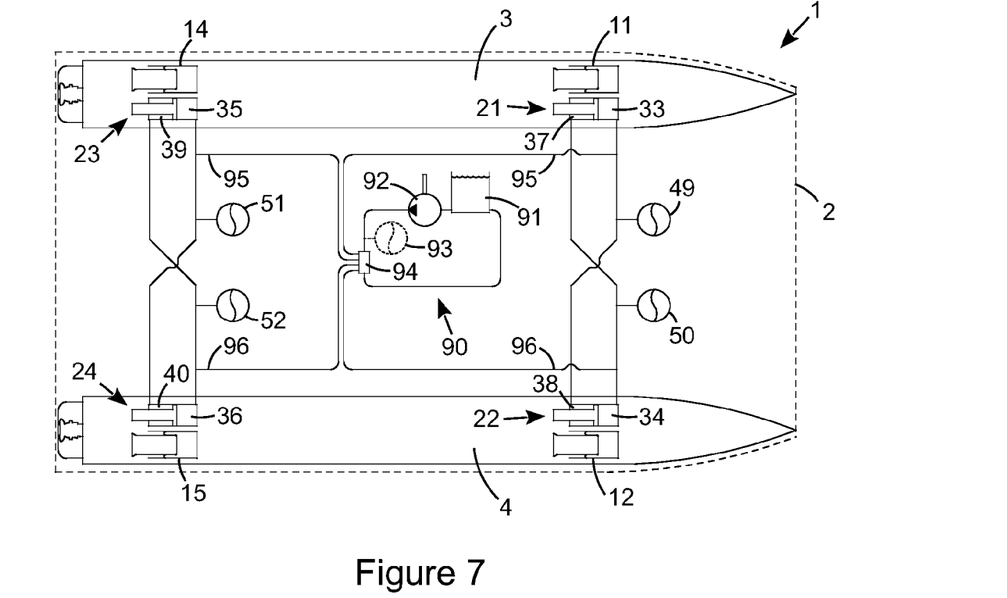
FIG. 7 is a schematic plan view of a marine vessel according to the present invention.

FIG. 7 shows such a separate front and back ram system applied to a catamaran having a body 2 and a left and a right hull (3 and 4), but with a fluid pressure adjustment arrangement 90 also shown. Air springs 11, 12, 14, 15 are shown in parallel with the roll rams 21, 22, 23, 24. A pressure adjustment arrangement 90 includes a fluid reservoir or tank 91, a pump 92, an optional supply accumulator 93 and a valve manifold 94 for selectively communicating the front left, front right, back left or back right conduits (part of the respective front left, front right, back left or back right fluid volumes) with either high pressure fluid (from the pump or supply accumulator) to increase the pressure and fluid volume in the respective circuit or the tank to reduce the pressure and fluid volume in the respective circuit. This permits the operating pressure of the front and back left and right fluid volumes to be adjusted to thereby vary the front roll stiffness (i.e. the roll stiffness provided by the front pair of laterally cross-connected rams) and the back roll stiffness (i.e. the roll stiffness provided by the back pair of laterally cross-connected rams) independently giving control of both overall roll stiffness and roll moment distribution.

Figure 8:
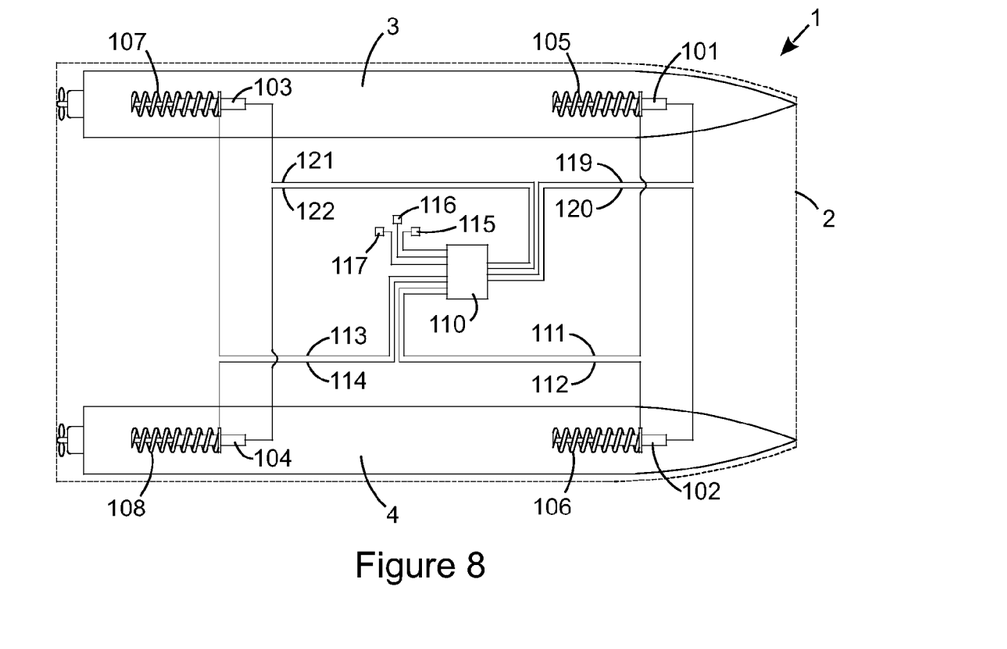
FIG. 8 is a schematic plan view of a marine vessel according to the present invention.

FIG. 8 shows a further alternative arrangement of suspension system utilising electro-mechanical actuator devices 101, 102, 103, 104 in parallel with support springs 105, 106, 107, 108 shown as a coil-over style arrangement (although any known arrangement of parallel spring and actuator is envisaged at each corner assembly). The electromagnetic actuators can be used to absorb energy input to the suspension system by providing regenerative damping for example, and to provide energy back into the suspension system by using electrical power to generate force and or displacement at the actuator. Each actuator can be controlled individually, ideally by a central control unit 110 so that the distribution of roll forces can be controlled. Individual corner assembly parameters such as spring force or displacement (or actuator displacement) and actuator force are measured and transmitted to the control unit 110 along sensing lines 111, 112, 113, 114. These inputs can indicate or allow calculation of operating parameters such as load, load position and sea state. Additional sensors such as 115, 116, 117 can include steering position, speed, GPS position and/or lateral acceleration to indicate or allow calculation of operating parameters such as operating mode (moored, displacement, semi-planing or planing) and turning condition (whether the vessel is turning or heading straight with or without leeway). The control unit can then determine the appropriate roll moment distribution for the suspension system and control the actuator loads accordingly using controlling lines 119, 120, 121, 122.

The actuators in FIG. 8 (and optionally the springs also) can be replaced by hydraulic actuators such as hydro-pneumatic devices for example which can similarly be used as independent (as opposed to interconnected) rams and individually controlled as discussed above in relation to FIG. 8. Such hydro-pneumatic devices can include variable damper valves which can be used to generate power and each actuator can be double acting to provide the required force in any situation. The hydraulic actuators can be in parallel with the support springs as in known lower power consumption active control systems, or alternatively the actuators can provide the primary source of support for the body portion which generally increases power consumption, although the frequency of operation also affects power consumption.

Alternatively, the actuators in FIG. 8 can be replaced by linear actuators in series with the resilient supports such as coil springs. The linear actuators can be hydraulic or electro-mechanical devices such as adjustable spring seats.

While FIG. 2 shows the planing pressure force $F_P$ resulting from the hydro-dynamic pressure acting over an area of the hull at around three-quarters of the hull length below waterline from the transom, the actual position of this force varies with a number of factors including hull form, loading, speed and wave encounter. The pressure acting over the planing area generally increases with speed and the size of the planing area generally reduces with speed so the magnitude and position of the planing force $F_P$ vary with speed. The static position of the pressure force $F_P$ acting on a hull can be entirely estimated or can be measured (for example in tank tests) for the hull form for various speeds and loading conditions or trim angles and then the data used to estimate the position of the pressure force for a set of operating parameters. The static position of the pressure force $F_P$ acting on a hull varies with wave encounter due to the changing planing area as the wave form intersects the hull form. As the centroid of the planing pressure area is approximately where the planing force $F_P$ acts, narrow bow hull forms and other hull forms having a substantially triangular pressure area with a tip towards the bow of the hull can be less affected by wave encounters than flat square fronted punt hull forms with substantially rectangular planing pressure areas. As the centroid of the planing pressure area of a narrow bow planing hull moves relatively little with wave encounters and as such a hull form generally has lower pitch damping in the water than a hull with a squarer shaped bow, narrow bow hulls or more accurately hulls with a planing area that is relatively long and approximately triangular, narrowing towards the front, are generally less prone to large swings in the longitudinal position of the overall resultant water support force FR acting on the hull than hulls with a planing area that is relatively rectangular as the vessel encounter waves in operation.

As shown by the variation in numbers of hulls and types of suspension systems described above and shown in FIGS. 3 to 7, the present invention can be applied across a range of multi-hull marine vessel applications.

Modifications and variations as would be apparent to a skilled addressee are deemed to be within the scope of the present invention.

The invention claimed is:

1. A marine vessel comprising:
   a suspension system;
   a body portion; and
   at least a left hull and a right hull;
   the body portion at least partially supported relative to the left hull and the right hull by the suspension system, the left hull and the right hull being individually moveable in heave and pitch relative to each other and the body;
   the suspension system including resilient supports between the body portion and the left and right hulls, the suspension system providing at least a roll stiffness; and
   the suspension system arranged to provide a roll moment distribution wherein roll forces effectively act on each hull at a position disposed within a longitudinal distance along the marine vessel from a steady state position of resultant pressure forces acting on the hull when the marine vessel is operating in a planing or semi-planing mode;
   the longitudinal distance being 20% of a waterline length of the hull at design load in displacement mode.

2. A marine vessel as claimed in claim 1 wherein the longitudinal distance is 15% of the waterline length of the hull at design load in displacement mode.

3. A marine vessel as claimed in claim 1 wherein the longitudinal distance is 10% of the waterline length of the hull at design load in displacement mode.

4. A marine vessel as claimed in claim 1 wherein the longitudinal distance is 5% of the waterline length of the hull at design load in displacement mode.

5. A marine vessel as claimed in claim 1 wherein the roll moment distribution of the suspension system is fixed.

6. A marine vessel as claimed in claim 1 wherein the suspension system resilient supports include at least a front left, front right, back left and back right resilient support.

7. A marine vessel as claimed in claim 6 wherein the front left, front right, back left and back right resilient supports include a respective front left, front right, back left and back right hydraulic actuator, the hydraulic actuators being interconnected to provide a different stiffness in two or more of a roll, pitch heave and warp suspension mode.

8. A marine vessel as claimed in claim 1 wherein the roll moment distribution of the suspension system is adjustable in dependence on at least one operating parameter of the marine vessel.

9. A marine vessel according to claim 8 wherein the at least one operating parameter of the vessel is obtained from at least one load sensor.

10. A marine vessel according to claim 8 wherein the at least one operating parameter of the vessel includes vessel speed and/or an operating mode of at least one hull.

11. A marine vessel according to claim 8 wherein the at least one operating parameter of the vessel includes sea state and/or turning condition and/or lateral acceleration.

12. A marine vessel as claimed in claim 8 wherein the suspension system resilient supports include an anti-roll bar having respective left and right hull attachment points,
wherein the longitudinal position of at least the left and right hull attachment points is varied to thereby adjust the roll moment distribution of the suspension system.

13. A marine vessel according to claim 8 wherein the suspension system resilient supports include at least a front left, front right, back left and back right single-acting hydraulic actuator, each respective single-acting actuator including a respective compression chamber,
a front left fluid volume including the compression chamber of the front left single-acting actuator and a front left conduit,
a back left fluid volume including the compression chamber of the back left single-acting actuator and a back left fluid conduit, the front left and back left fluid volumes being interconnected by a left fluid amplifier,
a front right fluid volume including the compression chamber of the front right single-acting actuator and a front right fluid conduit,
a back right fluid volume including the compression chamber of the back right single-acting actuator and a back right fluid conduit, the front and back right fluid volumes being interconnected by a right fluid amplifier,
the left fluid amplifier providing a pressure ratio between the respective left fluid volumes, and the right fluid amplifier providing a pressure ratio between the respective right fluid volumes, the left and right fluid amplifiers modifying the roll moment distribution provided by the hydraulic actuators,
a left bypass arrangement between the left fluid conduits and a right bypass arrangement between the right fluid conduits, the left and right bypass arrangements each including a respective bypass valve to selectively provide a bypass around the fluid amplifier to enable switching of the roll moment distribution, and the bypass arrangement switchable in response to at least one operating parameter of the marine vessel.

14. A marine vessel according to claim 8 wherein the suspension system resilient supports include at least a front left, front right, back left and back right double-acting hydraulic actuator, the front left and front right double-acting actuators being laterally cross-connected to form a front left and a front right fluid volume, the back left and back right double-acting actuators being laterally interconnected to form a back left and back right fluid volume,
the system including a fluid amplifier, the front left and back left fluid volumes being interconnected by left fluid conduits including the fluid amplifier and the front right and back right fluid volumes being interconnected by right fluid conduits including the fluid amplifier.

15. A marine vessel according to claim 14 further including a left bypass arrangement between the left fluid conduits and a right bypass arrangement between the right fluid conduits, the left and right bypass arrangements each including a respective bypass valve to selectively provide a bypass around the fluid amplifier to enable switching of the roll moment distribution, and the bypass arrangement switchable in response to at least one operating parameter of the marine vessel.

16. A marine vessel according to claim 14 wherein the fluid amplifier is adapted to vary the proportion of pressure between the front left and back left fluid volumes and between the front right and back right fluid volumes to enable the roll moment distribution to be continuously varied.

17. A marine vessel as claimed in claim 8 wherein the suspension system includes individually controllable front left, front right, back left and back right actuators, said individually controllable actuators being controllable to thereby adjust the roll moment distribution of the suspension system.

18. A marine vessel as claimed in claim 1 wherein the body portion is entirely supported above the at least a left hull and a right hull.

19. A marine vessel as claimed in claim 1 wherein the body portion includes a hull portion.

20. A method of controlling the suspension response of a suspension system of a marine vessel, the marine vessel including a body portion at least partially supported relative to at least a left hull and a right hull by the suspension system, the suspension system providing a roll moment distribution wherein roll forces effectively act on each hull at a position and being arranged such that the roll moment distribution is adjustable by adjusting said position,
the method including the steps of using at least one sensor to detect at least one operating parameter of the marine vessel, and adjusting the position at which the roll forces of the suspension system effectively act on each hull in dependence on said at least one operating parameter so as to thereby adjust the roll moment distribution in dependence on said at least one operating parameter.

* * * * *